(12) United States Patent  
Shapiro et al.

(10) Patent No.: US 8,676,823 B2  
(45) Date of Patent: Mar. 18, 2014

(54) EFFICIENT STUDENT RECORD MATCHING

(75) Inventors: Douglas T. Shapiro, Brooklyn, NY (US); Diana Gillum, Ashburn, VA (US)

(73) Assignee: National Student Clearinghouse, Herndon, VA (US)

( * ) Notice: Subject to any disclaimer, the term of this patent is extended or adjusted under 35 U.S.C. 154(b) by 38 days.

(21) Appl. No.: 13/211,031

(22) Filed: Aug. 16, 2011

(65) Prior Publication Data

US 2013/0046775 A1 Feb. 21, 2013

(51) Int. Cl.
*G06F 17/00* (2006.01)
*G06F 17/30* (2006.01)

(52) U.S. Cl.
USPC .......................................... 707/758

(58) Field of Classification Search
USPC ........... 707/758, 770, 999.01; 705/18, 76–77, 705/327
See application file for complete search history.

(56) References Cited

U.S. PATENT DOCUMENTS

| | | | |
|---|---|---|---|
| 7,263,491 B1 * | 8/2007 | Geldermann et al. | 705/326 |
| 2004/0133561 A1 * | 7/2004 | Burke | 707/3 |
| 2008/0208873 A1 * | 8/2008 | Boehmer | 707/10 |
| 2008/0312909 A1 * | 12/2008 | Hermansen et al. | 704/9 |
| 2009/0271363 A1 | 10/2009 | Bayliss | |
| 2009/0276692 A1 * | 11/2009 | Rosner | 715/227 |
| 2010/0004997 A1 * | 1/2010 | Mehta et al. | 705/14.66 |
| 2010/0028847 A1 | 2/2010 | Downing | |

OTHER PUBLICATIONS

LinkWiz User Manual, Version 5.1, Jul. 2009.
Link King User Manual, Version 5.2, 2006.
Choice P20 Directory and Identity Manager, 2010.

* cited by examiner

*Primary Examiner* — Sherief Badawi
*Assistant Examiner* — Berhanu Mitiku
(74) *Attorney, Agent, or Firm* — Dickstein Shapiro LLP

(57) ABSTRACT

A system and method for efficiently and intelligently matching student enrollment records is disclosed. The method may be used, for example, to track student progress from secondary to postsecondary institutions and generate statistics about aggregate college enrollment rates to inform policy decisions. In exemplary embodiments, the matching algorithm accounts for common variations in student names and geographical distances between secondary institutions and the student's current known address to generate higher confidence matches.

9 Claims, 3 Drawing Sheets

EFFICIENT STUDENT RECORD MATCHING

BACKGROUND OF THE INVENTION

It is a national imperative to ensure that all students graduate from high school ready for college. There is a large achievement gap to close and our nation needs to raise the standard of education for all students in order to remain competitive. While there are a range of challenges to achieve these goals, there is great momentum for change emerging from the federal government, the efforts of many states, districts and education innovators as well as philanthropists.

Some groups aim to ensure that 80% of high school students graduate from high school ready for college, with a focus on supporting low-income and minority young people in reaching this target. A key component of this strategy is ensuring the availability of rich, reliable data with which to make sound policy and practice decisions at all levels from the schoolhouse to the state house that have a high impact on students' achievements and outcomes. This data provides both outcome data on the performance of the K-12 education system and a powerful data set for evaluation of programs. Further, the most likely way to measure the success of a college ready strategy will be to assess the postsecondary performance and outcomes of students.

Some of the unique questions that need to be answered are as follows:

What percentage of our high school graduates attend college the fall following their graduation or within two years of graduation?

What percentage of our student body remains enrolled from year to year and what percentage obtains a degree?

How do answers to these questions differ across districts, high schools and key student subgroups? How do answers to these questions differ for various types of postsecondary institutions (e.g., public/private, 2-yr/4-yr, selective/non-selective)?

What is the relationship between K-12 events (e.g., high school courses completed, state achievement test scores) and postsecondary outcomes?

What postsecondary outcomes are associated with our specific K-12 programs—especially programs designed to increase college readiness and attendance?

Finding answers to these questions present numerous unique and challenging problems. The amount of data that must be recorded and maintained is a challenge in itself, even in this digital age. However, current database technology allows for management of large amounts of data, if the data is properly organized and given proper identifiers for indexing. Proper indexing allows for searches to be performed efficiently and with high reliability. With the data amassed and proper indexing, some of the above questions could be answered and solutions found for some of our educational problems.

Currently, records of the majority of college students in the nation are stored and kept by the National Student Clearinghouse. This organization provides a service necessary for many governmental functions, such as college loan services by maintaining a database of updated information from colleges and universities reflecting their current enrollment. This database currently holds numerous records reflecting college enrollment data from 1993. High school districts around the country have information on their students, including how they have scored on standardized tests, their ethnicities and other factors that could affect education.

The ability to match the records from high schools to college enrollment records can be difficult because of the differences that occur between secondary and postsecondary records. These problems may range from simple clerical errors, to a student changing his name, to what form of a student's name is recorded. For example, a student's name on a secondary record may be Jimmy Johnson, but his name is recorded as James Johnson or Jim Johnsen in a postsecondary record. Under these circumstances, matching the secondary record with the postsecondary record may be difficult and may not occur even though a student has a record in both databases. This could lead to the false conclusion that Jimmy did not go to college.

To help to prevent non-matches from occurring, a user will often want to use a student's SSN as an identifier to obtain matches. However, under current privacy laws, such as FERPA, a researcher may not be allowed to use a SSN to match records for research purposes. Thus, agencies and researchers may be forced to search using names and DOB resulting in less accurate results.

Thus, what is needed is a system that allows for increased reliability and efficiency in matching postsecondary databases to provide matches with secondary student information while conforming to laws protecting student information.

BRIEF SUMMARY OF THE INVENTION

A computer system and computer based method for efficiently and intelligently matching student enrollment records is disclosed. The method may be used, for example, to utilize computers to track student progress from secondary to postsecondary institutions and generate statistics about aggregate college enrollment rates to inform policy decisions. In an exemplary embodiment, records from secondary institutions, such as high schools, may be matched with records from post-secondary institutions, such as universities and colleges.

Matching records from the institutions may be performed using a computer based matching algorithm implemented in a computer processor that matches records based on names, variations of names, date of births, geographic location, enrollment dates, and secondary institution codes. In an exemplary embodiment, the matching algorithm may match names and dates of birth based on common variations in the spelling of names of students. The common variations of names may be determined by reviewing previously matched student enrollment records and identifying common variations in the spelling of the name of students. The matching algorithm may also swap the first and middle names of a record to match that record with other records. Additionally, the matching algorithm may account for geographical distances between secondary institutions and a student's current known address to generate higher confidence matches. Furthermore, the matching algorithm may compare enrollment dates associated with post-secondary institutions records with the student's graduation dates from his secondary institution record.

DETAILED DESCRIPTION

In the following detailed description, reference is made to the accompanying drawings, which form a part hereof and show by way of illustration specific embodiments of the present invention. These embodiments are described in sufficient detail to enable those skilled in the art to practice them, and it is to be understood that other embodiments may be utilized, and that logical, and processing changes may be made.

Figure 1:
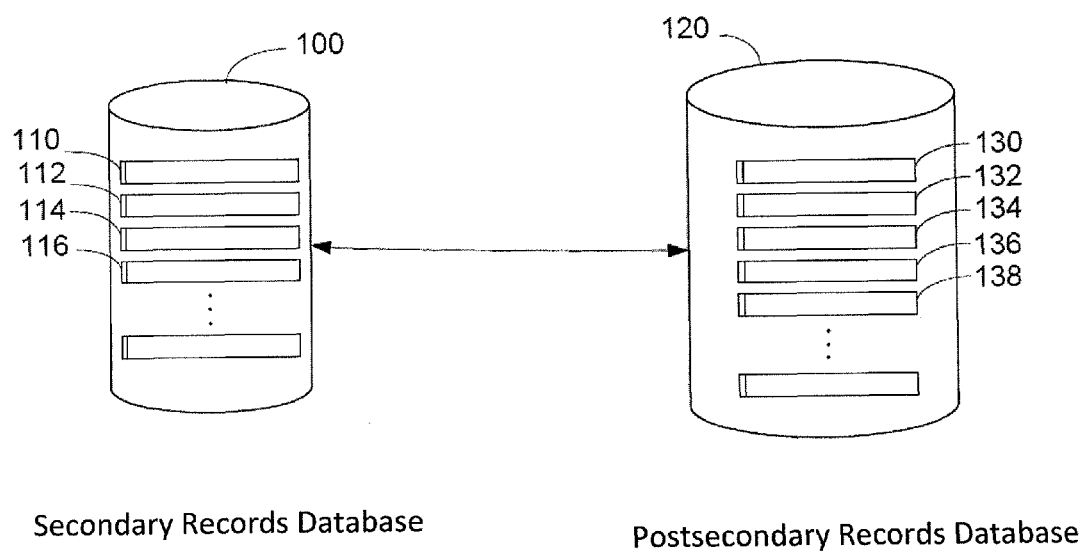
FIG. 1 illustrates secondary and postsecondary records databases and individual records therein.

FIG. 1 illustrates secondary (high school) records database 100, postsecondary records database 120. Secondary records database 100 contains records 110, 112, 114, 116, wherein each record 110, 112, 114, 116, contains the information of an individual student. Records 110, 112, 114, 116 may contain the first and last names, middle name or initial, SSN, date of birth (DOB), graduation date from the secondary school, and the secondary school code. Alternatively, records 110, 112, 114, 116 may contain a student's SSN, first and last names, ethnicity, and high school code. Some records 110, 112, 114, 116 may contain the SSN and others may not. Further, each individual record 110, 112, 114, 116 may contain different information besides first and last name and DOB. In essence, records 110, 112, 114, 116 may contain any number of identifiers and attributes of a student and should not be limited to the examples given.

Postsecondary database 120 contains student records 130, 132, 134, 136, 138. Each of these records 130, 132, 134, 136, 138 may contain the same information as records 110, 112, 114, 116 in secondary records database 100, such as a student's first and last name, middle name or initial, SSN, DOB, and other identifying information. It should be understood that records 130, 132, 134, 136, 138 may contain other information and the information may not be limited to the examples given. Postsecondary records 130, 132, 134, 136, 138 are supplied by postsecondary institutions and reflect these institution's respective enrollment records. Further, each postsecondary record 130, 132, 134, 136, 138 is given a unique or specific postsecondary identifier when it is created in the postsecondary database 120.

Secondary records database 100 and postsecondary records database 120 may be configured in any database structure that allows the databases to be effectively stored and searched. Secondary database 100 may contain records that have been pre-selected for having a particular attribute. For example, all of the records in secondary database 100 may be students that went to a certain high school or went to high school in a certain region. Further, secondary database 100 may contain records of students of a specific ethnicity or those students that scored above or below a certain threshold score on a specific standardized test. Any combination of factors (e.g. those relevant to tracking educational achievement) may be used to determine what records to include in secondary database 100.

To track educational progress it is necessary to determine which of these pre-selected students in secondary database 100 went on to enroll in a postsecondary institution. To do so, records in secondary database 100 are matched with records in postsecondary database 120 as illustrated in matching process 200 illustrated in FIG. 2.

Figure 2:
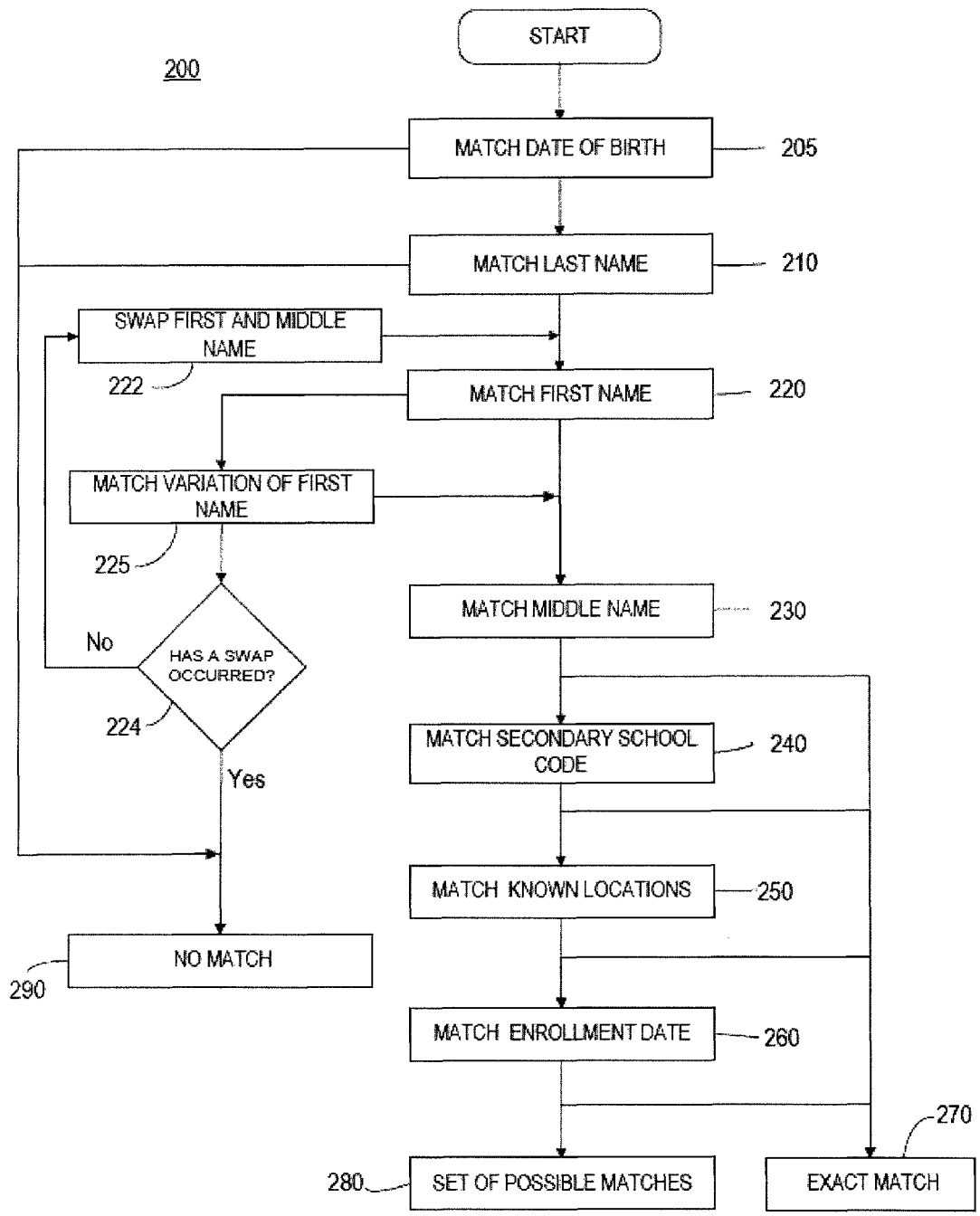
FIG. 2 illustrates a matching algorithm used to match records between the secondary and postsecondary databases.

FIG. 2 illustrates a computerized matching process 200 that may be used to match records according to an exemplary embodiment. In particular, process 200 may be used to match student records. Computerized process 200 may be implemented on a processor such as a server (e.g. server 310 in FIG. 3) using computer readable code. Computerized process 200 may be implemented to match student records stored in the same database or in different databases. For example, process 200 may be used to match record 110 from secondary database 100 with its corresponding record in post-secondary database 120.

Computerized process 200 begins by obtaining an unmatched record that is to be matched to a record in a database. For example, the unmatched record may be a student record 110 that contains fields about a student, such as the student's first and last names, student's middle name or initial, DOB, secondary school code, secondary school zip code, and secondary school graduation date and the database may be the post-secondary database 120.

Next, at computer processing step 205, computerized process 200 matches the DOB of the unmatched record to the DOBs of records in the database. The computerized process 200 first performs a strict character matching function that requires the match to be exact. If one or more records are found that contain the exact last name, computerized process 200 proceeds to computer processing step 210. If no matches are located, computerized process 200 performs partial matching allowing one or more characters to be incorrect. For example, computerized process 200 may find that the DOB of Jan. 31, 1988 of the unmatched record matches the DOB of Jan. 21, 1988 from a record in the database. It should be understood that the number of matched characters needed to match the DOBs in the records may vary.

If no matches are identified, computerized process 200 proceeds to computer processing step 290 and indicates that no match was found. If the DOB of one or more records were matched to the DOB of the unmatched record, computerized process 200 proceeds to computer processing step 210.

At computer processing step 210, computerized process 200 matches the last name of the unmatched record to last names of records in the database. The computerized process 200 first performs a strict character matching that requires the match to be exact. If one or more records are found that contain the exact last name computerized process 200 proceeds to computer processing step 220. If no matches are located, computerized process 200 performs partial matching allowing one or more characters to be incorrect. For example, computerized process 200 may find that the last name of Weinstein of the unmatched record matches the last name of Wienstein from a record in the database. It should be understood that the number of matched characters needed to match the last names in the records may vary.

If no matches are identified, computerized process 200 proceeds to computer processing step 290 and indicates that no match was found. If the last names of one or more records were matched to the last name of the unmatched record, computerized process 200 proceeds to computer processing step 220. At computer processing step 220 computerized process 200 matches, using exact matching, the first names of the unmatched record to the first names of the records matched at computer processing step 210. If no exact matches are located, computerized process 200 performs partial matching of the first name from the unmatched record to the records matched at computer processing step 210. Computerized process 200 may follow the same criteria for partial matching used at computer processing step 210 or different criteria. If one or more matches are located, computerized process 200 proceeds to computer processing step 230.

If no matches are located, computerized process 200 proceeds to computer processing step 225 and performs matching of the first names using names from a name variation database. The name variation database provides and ranks known variations of first names. The variation database may include empirical analysis of historical name variations compiled using records within the database. The variation database may also be populated based on records that are matched using computerized process 200 or by a human analyst. The variation database may be updated continuously or periodically based on new records in the database and new matches made using computerized process 200 or by human analyst. For example, for the name Lyndsey, the variation database may include a set variations such as Lindsey, Lyndsay, Lindsay, Lindsi, and others. As another example, for the name Cami, the variation database may include a set of variations such as Camille, Camile, Camilla, Camill, and others. As another example, for the name Christopher, the variation database may include such variations as Chris, Cris, Christofer, and others.

To perform matching of the first names using names from a name variation database, computerized process 200 first identifies the set of variations from the name variation database that includes the first name of the unmatched record. If none of the set of variations from the name variation database contain the first name of the unmatched record, computerized process 200 proceeds to computer processing step 224. Otherwise, computerized process 200 compares all of the names within that set of variations to the first names of the records in the database that were matched at computer processing step 210. If none of the names from the database that were matched at computer processing step 210 include any of the names within the set of variations, computerized process 200 proceeds to computer processing step 224. Otherwise computerized process 200 may rank the matches made with names from the set of variations according to the rank of the names that were matched. After completing the matching, computerized process 200 proceeds to computer processing step 230.

At computer processing step 224, computerized process 200 determines if the first and middle names have been swapped. If the first and middle names have been previously swapped, computerized process 200 proceeds to computer processing step 290 and indicates that no match was located. If the first and middle names have not been previously swapped, computerized process 200 proceeds to computer processing step 222. At computer processing step 222, the first and middle names of the unmatched record are swapped so that the middle name becomes the first name for matching purposes. After swapping the first and middle names, computerized process 200 returns to computer processing step 220 and attempts to match the middle name of the unmatched record to the first names of the records in the database. If a match is made at computer processing step 220, computerized process 200 proceeds to computer processing step 270.

At computer processing step 230, computerized process 200 matches the middle name or middle initial of the unmatched record to the middle name or middle initial of the records matched at computer processing step 220 using exact matching. If no exact matches are located, computerized process 200 performs partial matching of the middle name or middle initial from the unmatched record to the records matched at computer processing step 220. Process 200 may follow the same criteria for partial matching used at computer processing step 210 and computer processing step 220 or different criteria. If only one match is located, computerized process 200 proceeds to computer processing step 230 and indicates that an exact match is found. If more than one match results from computer processing step 230, computerized process 200 proceeds to computer processing step 240.

At computer processing step 240, computerized process 200 matches the secondary school codes of the unmatched record to the secondary school code of the records matched at computer processing step 230. If there is only one exact match, computerized process 200 proceeds to computer processing step 270. If there are no matches or more than one match, computerized process 200 proceeds to computer processing step 250.

At computer processing step 250, computerized process 200 utilizes a regional mapping database to match a zip code associated with a secondary school from the unmatched record to a zip code of the student in records of the database. The regional mapping database contains data that associates zip codes surrounding a secondary school to the secondary school code in the unmatched record. The associated zip codes of the secondary school may then be matched to a student zip code in the records matched at computer processing step 240 or matched at computer processing step 230 if no matches occurred at computer processing step 240. For example, the unmatched record may contain a secondary school code that, based on the regional mapping database, is associated with the following zip codes: 22040, 22041, 22042, 22043, 22044, and 22046. The regional mapping database may include empirical analysis of zip codes relating to schools compiled using records within the database. The regional mapping database may also be populated based on records that are matched using computerized process 200 or by a human analyst. The regional mapping database may be updated continuously or periodically based on new records in the database and new matches made using computerized process 200 or a human analyst.

To match a zip code associated with the unmatched record to a zip code of a student record in the database, computerized process 200 first identifies the set of zip codes from the regional mapping database that is associated with the secondary school code of the unmatched record. If none of the zip codes from the regional mapping database are associated to the secondary school code of the unmatched record, computerized process 200 proceeds to computer processing step 260. Otherwise, computerized process 200 compares the set of zip codes associated with the unmatched record to the student zip codes of the records in the database that were matched at computer processing step 240 or 230. If there is only one exact match, computerized process 200 proceeds to computer processing step 270. If there are no matches or more than one match, computerized process 200 proceeds to computer processing step 260.

At computer processing step 260, computerized process 200 matches the secondary school graduation dates of the unmatched record to the enrollment dates of the records that were matched at computer processing step 250, or matched at computer processing step 240 if no matches occurred at computer processing step 250, or matched at computer processing step 230 if no matches occurred at computer processing step 240 and computer processing step 250 within an acceptable range. For example, if the secondary school graduation date was Jun. 15, 2008, it could be matched to enrollment dates in August and September of 2008. If there is only one match, computerized process 200 proceeds to computer processing step 230. If there are no matches or more than one match, computerized process 200 proceeds to computer processing step 280. At computer processing step 280, computerized process 200 reports all of the potential matches.

It should be understood that computerized process 200 may vary in scope and should not be limited to the exact process described. One or more steps may be omitted from process 200 as well as additional steps may be added. Matching computerized process 200 provides various advantages. For example, it provides a process to match records with varying spellings and alternations of names. The process also provides the ability to narrow the scope of potential matches using information besides matching of only names and using the limited information provided by secondary records.

Figure 3:
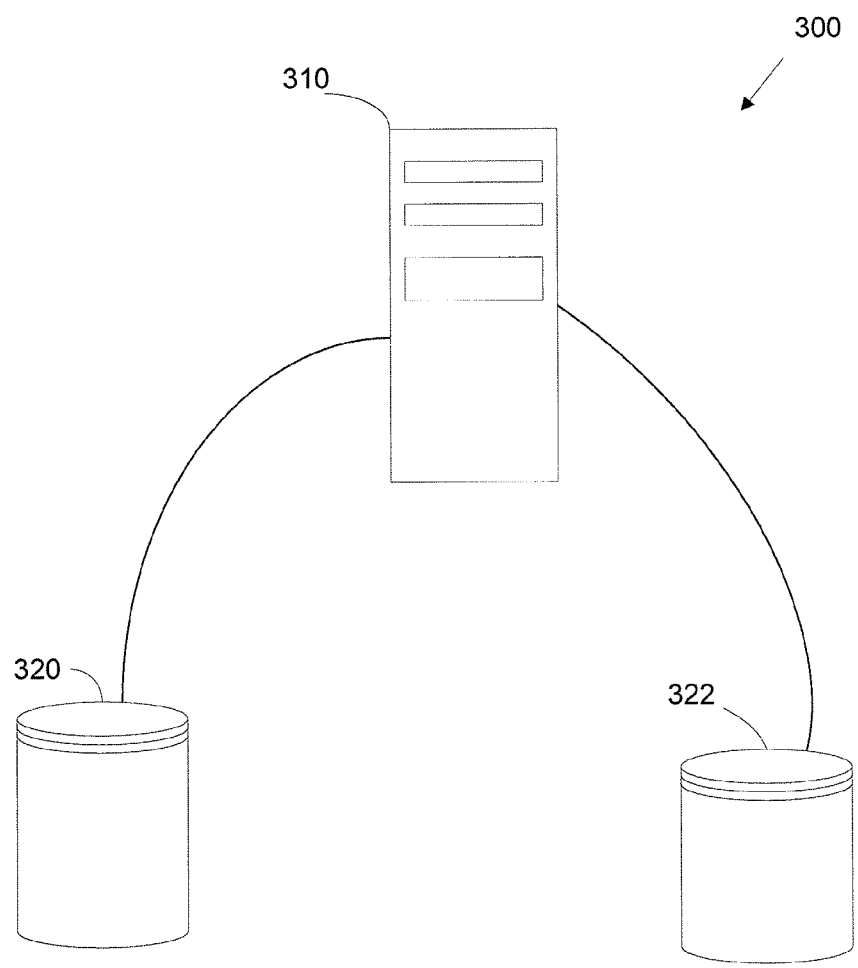
FIG. 3 illustrates a hardware system used for matching.

FIG. 3 shows a system 300 that includes first and second data storage 320,322. System 300 further includes server 310 that is connected to data storage 320, 322. In one embodiment, server 310 is a Database Server from IBM, Model No. 3650 that runs Oracle software. Data storage 320, 322 could be part of an IBM DS4800 storage system. In one embodiment, secondary database 100 is located in data storage 320 and post secondary database 120 is located in data storage 322. Server 310 communicates with data storage 320, 322 and transfers information between databases. Further, server 310 runs an algorithm for determining if records from one database match with another database. In another embodiment, databases 100, 120 are all located in the same data storage but in different parts of the data storage.

The above description and drawings illustrate preferred embodiments which achieve the objects, features, and advantages of the present invention. Although certain advantages and preferred embodiments have been described above, those skilled in the art will recognize that substitutions, additions, deletions, modifications and/or other changes may be made without departing from the spirit or scope of the invention. Accordingly, the invention is not limited by the foregoing description but is only limited by the scope of the claims in any subsequent non-provisional application claiming priority hereto.

We claim:

1. A computerized method for matching student education enrollment records, the method comprising:
    retrieving a first education enrollment record comprising a student name using a processor;
    determining via the processor common variations in the spelling of the student name;
    comparing via the processor the common variations in the spelling of the student name of the first enrollment record with other education enrollment records, wherein the comparing step comprises matching, using a historical name variation database, a first name of the student name and a set of historical name variations that includes the first name; and
    identifying at least one other education enrollment record associated with the student name based on the variations using the processor;
    wherein the identifying step comprises:
        swapping the first name and middle name of the student name using the processor; and
        identifying at least one other education enrollment record associated with the student name based on the swapped first and middle names using the processor; and
        matching at least one zip code associated with a school related to the first education enrollment record and a zip code associated with the student name.

2. The method of claim 1, wherein the determining step further comprises:
    reviewing previously matched student education enrollment records for other student names,
    and identifying common variations in the spelling of the student name.

3. The method of claim 1, wherein the identifying step comprises comparing enrollment dates associated with the first education enrollment record with the student's graduation dates from the at least one other education enrollment record.

4. The method of claim 1, wherein the first education enrollment record comprises a secondary education enrollment record.

5. A computer system for tracking student enrollment, the system comprising:
    a storage device containing secondary and postsecondary education enrollment records and a historical name variation database; and
    a processor configured to:
    retrieve a first secondary or postsecondary education enrollment record comprising a student name;
    determine common variations in the spelling of the student name;
    compare the common variations in the spelling of the student name of the first enrollment record with other education enrollment records; and
    identify at least one other secondary or postsecondary education enrollment record associated with the student based on the variations; and
    wherein the processor is further configured to:
        swap the first name and middle name of the student; and
        identify at least one other secondary or postsecondary education enrollment record associated with the student based on the swapped first and middle names; and
    wherein the common variations are compared by the historical name variation database in communication with the processor configured to match a first name of the student name and a set of historical name variations that includes the first name.

6. The system of claim 5, wherein the processor is further configured to review previously matched student education enrollment records and identify common variations in the spelling of the name of a student.

7. The system of claim 5, wherein the processor is further configured to calculate a distance between a school that the student attended and a current known address of the student.

8. The system of claim 5, wherein the processor is further configured to compare enrollment dates associated with the first secondary or postsecondary education enrollment record with the student's graduation dates from the at least one other secondary or postsecondary education enrollment record.

9. The system of claim 5, wherein the first secondary or postsecondary education enrollment record comprises a secondary education enrollment record.

* * * * *